(12) United States Patent
Balasubramanian et al.

(10) Patent No.: US 6,744,534 B1
(45) Date of Patent: Jun. 1, 2004

(54) ROBUST COLORIMETRY TRANSFORM

(75) Inventors: Thyagarajan Balasubramanian, Webster, NY (US); Robert J. Rolleston, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/562,775

(22) Filed: May 2, 2000

(51) Int. Cl.[7] .................. G06F 15/00; H04N 1/46
(52) U.S. Cl. ............... 358/1.9; 345/590; 345/589; 358/1.9; 358/518; 358/530; 358/1.15
(58) Field of Search .................. 345/204, 207, 345/243, 253, 589, 590, 690, 700, 593; 347/43; 358/1.9, 1.15, 504, 518, 530; 382/162, 232, 167

(56) References Cited

U.S. PATENT DOCUMENTS 5,734,802 A * 3/1998 Maltz et al. ............... 358/1.9
5,872,895 A * 2/1999 Zandee et al. ............. 358/1.9
6,342,951 B1 * 1/2002 Eschbach et al. .......... 358/1.9
6,427,030 B1 * 7/2002 Williams et al. ........... 382/252

OTHER PUBLICATIONS

Richard M. Adams II, "Choosing a Color Management Module", Secondsight, SS No. 73, a reprint from GATF-World, the magazine of the Graphics Arts Technical Foundation, 1999.

* cited by examiner

Primary Examiner—Kimberly Williams
Assistant Examiner—Thomas J. Lett
(74) Attorney, Agent, or Firm—Fay, Sharpe, Fagan, Minnich & McKee, LLP

(57) ABSTRACT

A method and color image processor for rendering a color image includes selective blending between transforms or rendering intents. Based on a pixels location within a color gamut of a first device the pixel is mapped to a color gamut of a second device as directed by a first transform or rendering intent, a second transform or rendering intent or a blend between the first and second transforms.

25 Claims, 7 Drawing Sheets

ROBUST COLORIMETRY TRANSFORM

BACKGROUND OF THE INVENTION

1. Field of the Invention

The invention relates to the art of color image rendering. It finds particular application where an image created on or prepared for rendering on a first or source device is rendered on a second or destination device.

2. Description of Related Art

When an image is prepared for rendering on an electronic device the image is represented as a set of pixels. Each pixel describes a small portion of the image in terms of colorant pixel values for the colorants available on the rendering device. For example, typically a cathode ray tube (CRT) based computer display screen is comprised of red (R), green (G) and blue (B) phosphors. An image prepared for display on a CRT is described with a set of pixels. Each pixel describes the intensity with which the red, green and blue phosphors are to be illuminated on a small portion of the CRT. A similar procedure is followed when an image is prepared for rendering on a printing device. Currently, at least some color printing devices apply cyan (C), magenta (M), yellow (Y), and sometimes black (K) colorants to a print medium, such as paper or velum, in order to render an image. Such printing devices are said to operate in a CMY or CMYK color space. When an image is prepared for rendering on a color-printing device, the image is represented as a set of pixels. Each pixel describes a small portion of the image by calling for an appropriate mixture of the available colorants. Typically, the pixel value for each colorant can range from 0 to 255. The higher a colorant's pixel value is, the more of that colorant the color image processor applies to the print medium. In a system employing 8-bit precision for the colorant signals, the number 255 represents the maximum or fully saturated amount of colorant. The number 0 is used when none of a particular colorant is required. It should be noted that sometimes, for the purposes of analysis or discussion this range is normalized to a range of 0 to 1.

In a CRT operating in RGB (red, green, blue) space, fully saturated red is described by pixel calling for R=255, G=0, B=0. In a printer operating in CMYK (cyan, magenta, yellow, black) space, fully saturated red is described by a pixel calling for C=0, M=255, Y=255, K=0. Magenta and yellow colorants combine through simple subtractive mixing and are perceived as red. There is no guarantee that the red described in RGB space and displayed on the CRT is the same red described in CMYK space and printed on a page. In fact, it is quite likely that the spectral properties of the red phosphor used in the CRT will be different than the spectral properties of the subtractively mixed magenta and yellow colorants of a particular printer.

As mentioned above, the CRT and the CMYK printer use different materials to generate the perception of color. The materials used impact a set of colors that each device can reproduce.

The set of colors a device can produce is referred to as the color gamut of the device. There is no guarantee that a color that can be produced by a first device can also be produced by second device. This is even true when both devices are CMYK printers.

Where color matching is required between two devices such as the CRT operating in RGB space and the printer operating in CMYK space, transforms based on careful calibration and measurement are required. In such a situation it is possible, for example, that the pure red RGB CRT pixel mentioned above, is mapped to a CMYK printer pixel calling for a less than fully saturated magenta component and a small amount of a cyan component. For example, the CMYK version of the original RGB red pixel referred to above might call for C=27, M=247, Y=255, K=0. Furthermore, if one wants to print a copy of the original pure red RGB CRT pixel on a second printer it is quite likely that a second transform will have to be used. That transform may translate the original RGB CRT pixel to a second CMYK pixel. For example, the second transform may map the original RGB CRT pixel to a second CMYK pixel calling for C=20, M=234, Y=240, K=35. One reason two different CMYK printers may require different transforms is that different printers use different colorants. For example, a first magenta colorant used in a first printer may have a different spectral content than a second magenta colorant used in a second printer. Likewise, a first yellow colorant used in a first printer may have a different spectral content than a second yellow colorant used in a second printer.

From the foregoing discussion it can be seen that an image prepared for rendering on a first device may need to be transformed if it is to be properly rendered on a second device. Such a transformation is an attempt to emulate the first or source device onto the second or destination device. In order to achieve spectral content matching, the emulation of the color gamut of the CRT on the first CMYK printer caused the red CRT pixel to be mapped to a first CMYK pixel calling for C=27, M=247, Y=255, K=0. The emulation of the color gamut of the CRT on the second CMYK printer caused the red CRT pixel to be mapped to the second CMYK pixel calling for C=20, M=234, Y=240, K=35. Obviously, therefore, even where there is no RGB CRT image involved, an image prepared for printing on the first printer may have to be transformed before its spectral content can be matched on the second printer. In such a situation the first printer is said to be emulated on the second printer.

For example, when, a photographic image has been prepared for rendering on a first CMYK device, for example a Standard Web Offset Printing (SWOP) device, but must then be rendered on a second CMYK device, for example, a xerographic printer, a "4 to 4" transform is typically used to emulate the first device on the second device.

In order to generate the 4 to 4 transform, a color characterization profile is needed for both devices. Each color characterization profile maps a calorimetric space, such as CIELAB to the device's color gamut. The mapping is bi-directional, so that each device's color gamut can also be mapped to the calorimetric space. The source image, the image prepared for printing on the first device, is transformed from the first device's CMYK space, via the first device's color characterization profile, into calorimetric space e.g. CIELAB. The calorimetric version of the image is then transformed via the second device's color characterization profile, into the second device's CMYK space.

Spectral matching, however, is not always the desired goal when rendering color images. For example, when rendering business graphics, such as pie charts and bar charts, a user is concerned with how vivid and pure the colors in the chart are and not with how well the rendered colors match a set of original colors.

Business graphics are most often composed of primary colors. For the purposes of this discussion the primary colors include red, green, blue, cyan, magenta, yellow, black and white. Red, green and blue are considered primary colors because they can be additively mixed to produce the perception of other colors in the human eye. Cyan, magenta, and yellow are considered primary colors because the human eye also perceives their subtractive mixture as other colors. White is perceived when red, green and blue are mixed in a well-balanced manner. Likewise, black is perceived when cyan, magenta and yellow are mixed in a well-balanced manner. Additive mixing of any two of red, blue and green produces one of cyan, magenta and yellow. Subtractive mixing of any two of cyan, magenta and yellow produces one of red, blue and green. For example, as indicated above, a balanced mixture of magenta and yellow is perceived as red.

In business graphics applications, the exact shade of color, for example, red, produced is not an issue. What is required is that the red produced appears pure and even. This is easily achieved when only one or two colorants are used to produce a color. When a third or fourth colorant are added, for example, in an attempt to match spectral content, the color can be perceived as uneven, dull and impure.

Furthermore, in a system employing colorants cyan (C), magenta (M), yellow (Y), and black (K) colorants, the rendition of dark vivid colors in business graphics applications is often best achieved by using not more than two of the colorants C, M, Y to produce the desired vividness, along with K to produce the desired darkness. That is, every pixel is rendered in 3-colorant combinations of CMK, MYK, or CYK. In such cases, contamination with a fourth colorant is undesirable, as it could reduce the vividness or purity of the color.

It is best therefore, when rendering business graphics, to accept the idiosyncrasies of the rendering device in exchange for a clean vivid appearance. The user is usually not concerned with how well the red on the rendered chart matches the red on the computer screen or the red as it was printed the week before on a different printer. The user usually just wants a pure red. If a transform is used, that attempts to emulate the source or original device on a new rendering device, the results can appear muddy or dirty. Therefore, currently, when one wants pure hues, such as when rendering business graphics, it is often better not to use a correcting transform. Instead one accepts the transform that is the inherent characteristic of the rendering device and makes a selection during a system configuration step that turns off the use of correcting transforms. The inherent characteristics of a particular rendering device are called the device transform.

When absolute or relative spectral accuracy between portions of an image are the dominating factor, then of course the user can make a selection to use correcting or emulating transforms. Requiring the user to make processing technique selections is problematic. In some instances the user does not have the expertise required to make informed processing technique decision. Where the user has the required expertise the process is still tedious and time-consuming. Furthermore, some images do not fall neatly into the category that clearly requires emulation transformation or the category for which only the device transform should be used. Some images contain both components that are best left untransformed and components that are best rendered through the use of emulation transformation.

Therefore a processing method is needed that consists of different techniques to accommodate the needs of different images and smoothly moves between techniques as the needs of a given image require.

BRIEF SUMMARY OF THE INVENTION

To that end, a new method and a device for rendering an image have been developed. The method takes an image comprised of pixels that has been prepared for rendering on a first device and prepares it for rendering on a second device. The method can be applied where the first device has an associated first color gamut, and where the first color gamut can be subdivided into at least a first sub-gamut, a second sub-gamut and a transition region between the first sub-gamut and the second sub-gamut. The second device also has an associated second color gamut that can be subdivided into at least a first sub-gamut, a second sub-gamut and a transition region. The method comprises the steps of finding each pixel's location within the first color gamut, mapping pixels located in the first sub-gamut of the first color gamut under a first rendering intent through a first transform to pixels within the first sub-gamut of the second color gamut, mapping pixels located in the second sub-gamut of the first color gamut under a second rendering intent through a second transform to pixels in the second sub-gamut of the second color gamut, and mapping pixels located between the first sub-gamut and the second sub-gamut of the first color gamut via a blend of the first transform and the second transform.

One advantage of the present invention is that it allows images to be rendered properly without user intervention.

Another advantage of the present invention is that it can be used to process images that contain both pictorial and business graphics type components.

Another advantage of the present invention is that it renders images in a more pleasing manner than do prior art techniques.

Another advantage of the present invention is that it preserves neutral colorant components of an image. This is especially useful in business graphics.

Another advantage of present invention is that it preserves primary color components of an image. This is also especially useful in business graphics.

Another advantage of present invention is that it preserves the purity and vividness of dark vivid colors in a business graphics image.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

Figure 1:
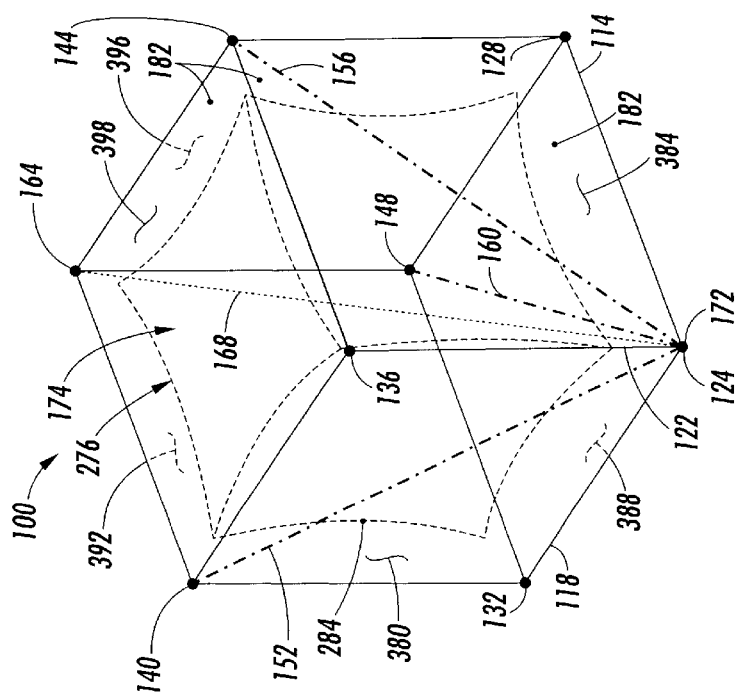
FIG. 1 is a diagram depicting a first device's color gamut.

Referring to FIG. 1, ignoring a black channel (not shown), which, when used only darkens the perceived colors or is used to replace neutral combinations of other colorants, a color gamut 100 for a first CMY or CMYK device can be illustrated as a cube. Three edges or axis of the cube represent pixel values for three colorants, for example, there can be a cyan 114, a magenta 118, and a yellow 122 axis. Each of the three axes 114, 118, 122 runs from an origin 124 where the pixel value of each colorant is zero, to a point representing the maximum amount of colorant available. In other words, a far end 128, 132, 136 of each axis 114, 118, 122 represents fully saturated cyan, magenta and yellow respectively. Three corners of the cube represent the fully saturated mixtures of two of the subtractive colorants cyan, magenta and yellow. A red corner 140 represents the fully saturated mixture of magenta and yellow. A green corner 144 represents the fully saturated mixture of yellow and cyan. A blue corner 148 represents the fully saturated mixture of cyan and magenta. Diagonal lines 152, 156, 160 connecting each of the red 140, green 144 and blue 148 corners with the origin 124 represent less than fully saturated shades of red, green and blue respectively. A black corner 164 represents the fully saturated mixture of all three colorants cyan, magenta, and yellow. A long diagonal line 168 connecting the black corner with the origin 124 represents neutral or gray combinations of the three colorants. The origin 124, where the pixel values of the three colorants are all zero, represents white (assuming the print medium is white) and so is also a white corner 172.

Figure 2:
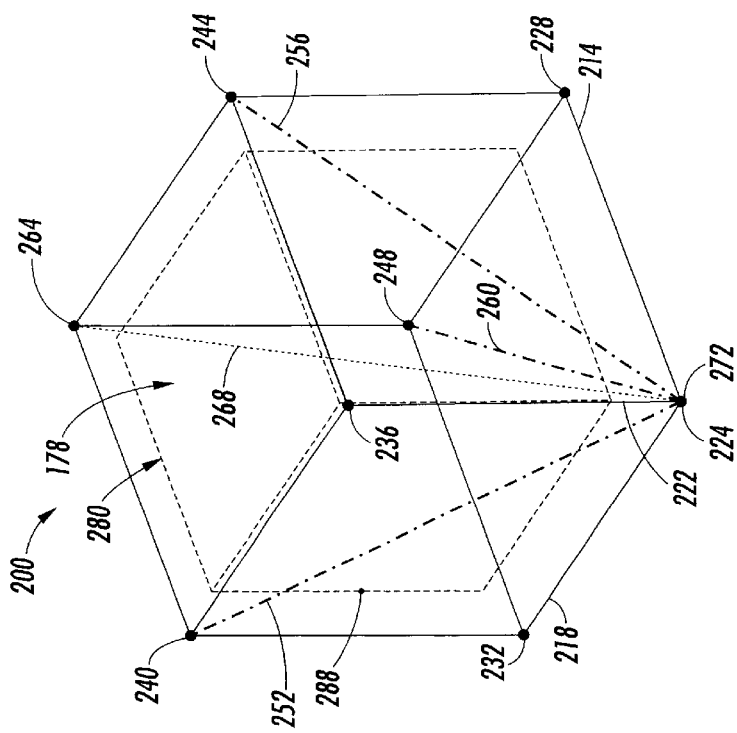
FIG. 2 is a diagram depicting a second devices color gamut.

Within the first devices color gamut 100 is a sub-gamut referred to as a pictorial gamut 174. A pictorial gamut is a set of colors most often used when rendering photographs and similar images. The centrally located pictorial gamut includes pixels calling for significant color mixture. Therefore the centrally located pictorial gamut 174 of the first device also represents those colors which require careful matching when an image that was prepared for rendering on the first device is to be rendered on a second device. It is likely that the pictorial gamut 174 of the first device will not match a pictorial gamut 178 of the second device. For example, see a second device'color gamut 200 illustrated in FIG. 2. When rendering colors from the first devices centrally located pictorial gamut 174 on the second device, it is desirable to match the colors as closely as possible. Therefore, an emulation transform is required when rendering these centrally located colors.

The colors that lie on the surface of the gamut cube, and particularly the primary colors that lie at the corners 128, 132, 136, 140, 144, 148, 168, 172 of the cube are those colors that are most often used in business graphics. The primary colors do not require careful spectral matching when an image that was prepared for rendering on first device is to be rendered on a second device. Indeed the presentation of these colors is often degraded when spectral matching is attempted. Therefore an emulation transform should not be used when mapping primary colors. Instead primary colors are said to be mapped through an identity transform. The identity transform does not change the pixel values of a pixel as it is mapped to the color gamut of another device.

Intermediate colors, such as those depicted at points labeled 182, that lie between the pictorial gamut 174 and the surface of the gamut cube, need to be treated to some degree as if they were in the pictorial gamut 174 and to some degree as if they were primary colors. In order to provide a smooth transition between how pictorial gamut pixels are transformed and how primary colors are transformed, pixels calling for intermediate colors 182 are transformed by a blend between the emulation transform and the identity transform. The degree to which the blended transform resembles the emulation transform or the identity transform is a function of the intermediate pixels location in the color gamut 100.

Referring to FIG. 2, and again ignoring a black channel (not shown), the color gamut 200 for a second CMY or CMYK device is illustrated as a cube. Three edges or axis of the cube represent pixel values for three colorants, for example, there can be a cyan 214, a magenta 218, and a 222 yellow axis. Each of the three axis 214, 218, 222 runs from an origin 224 where the pixel value of each colorant is zero to a point representing the maximum amount of colorant available. Again, the far end 228, 232, 236 of each axis 214, 218, 222 represents fully saturated cyan, magenta and yellow respectively. Again, three other corners of the cube represent the fully saturated mixtures of two of the subtractive colorants cyan, magenta and yellow. A red corner 240 represents the fully saturated mixture of magenta and yellow. A green corner 244 represents the fully saturated mixture of yellow and cyan. A blue corner 248 represents the fully saturated mixture of cyan and magenta. Again, diagonal lines 252, 256, 260 connecting each of the red 240, green 244 and blue 248 corners with the origin 124 represent less than fully saturated shades of red, green and blue respectively. A black corner 264 represents the fully saturated mixture of all three colorants cyan, magenta, and yellow. A long diagonal line 268 connecting the black corner with the origin 224 represents neutral or gray combinations of the three colorants. The origin is also a white corner 272.

Within the second device's color gamut is the second devices pictorial gamut 178. The second device's pictorial gamut 178 is different than the first device's pictorial gamut 174. The second device's pictorial gamut 178 has a different shape. The difference in shape is brought about, for example, by differences in the colorants used in each device. While the colorants share the same name, they are not necessarily made of the same materials. Therefore the colorants can have different spectral characteristics. While, for example, the edges 276, 280 of the two pictorial gamuts 174, 178 can represent the same perceived colors, they are created by different mixtures of colorants on the first and second devices. For example, a first pixel 284 on the first devices pictorial gamut 174 is ideally mapped to a second pixel 288 on the second device's pictorial gamut 178. When rendered, the pixels 284, 288 are perceived to be the same color. However, the pixels 284, 288 are rendered with different mixtures of different colorants. For example, the second pixel 288 contains less of the second device's cyan colorant than the first pixel 284 contains of the first device's cyan colorant.

Figure 3:
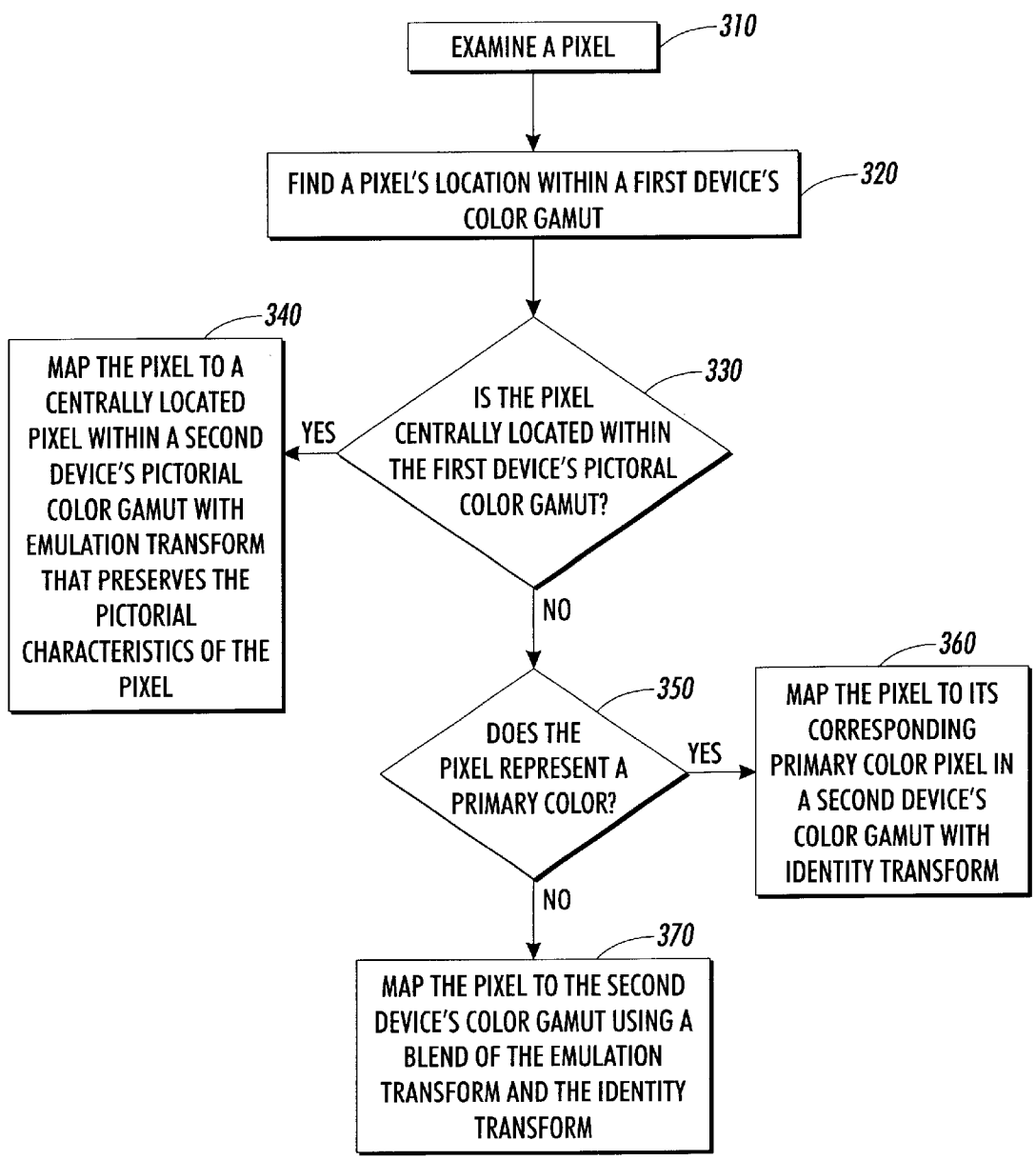
FIG. 3 is a flow diagram illustrating a process for rendering an image.

Referring to FIG. 3, a method 300 for mapping an image prepared for rendering on a first device to the color gamut of a second device can be broken down into a series of steps. The method 300 treats each class of pixel (centrally located, primary color and intermediate) in an image, appropriately.

In a beginning step 310 a pixel from the image is examined. In a location step 320 a pixel's location within the first device's color gamut is determined from colorant pixel values for each colorant called for by the pixel.

A first testing step 330 determines if the pixel is centrally located.

If the pixel is a centrally located pixel, it is mapped in a centrally located mapping step 340. Centrally located pixels call for a high degree of colorant mixing, and are treated as pictorial pixels. Therefore, centrally located pixels are mapped to the second or destination device's color gamut through the use of an emulation transform.

If the pixel is not centrally located, the pixel is passed to a second testing step 350. The second testing step 350 determines if the pixel values called for by the pixel describe a primary color.

If the pixel does describe a primary color the pixel is mapped, in a primary color mapping step 360, to the second or destination device's color gamut through an identity transform. The identity transform leaves the pixel values unchanged. The primary color is mapped to the destination device's version of that primary color. For example, if the pixel calls for the pure mixture of the first device's magenta and yellow to produce a first device's version of red, it is mapped to a pure mixture of the destination device's magenta and yellow to produce a destination device's version of red. It is understood and accepted that the first device's version of red and second device's version of red may not match. Any mismatch in hue or lightness is tolerated in the interest of preserving the primary colors vividness and purity.

If the pixel does not describe a primary color, the pixel must be located in an area of the first device's gamut 100, between the centrally located pixels or pictorial gamut 174 and the primary color pixels 152, 156, 160. Therefore, the pixel is mapped to the second or destination device's color gamut, in an intermediate pixel-mapping step 370, through a blending function that smoothly combines the effect of the emulation transform and the identity transform. The closer the pixel is to the centrally located pixels, the more it is treated like a centrally located pixel. The closer the pixel is to a primary color pixel, the more it is treated like a primary color pixel.

Having thus described the invention in general terms, the details of an embodiment that performs the steps described in reference to FIG. 3 will now be described.

In order to automatically locate a pixel and apply the appropriate mapping technique, a set of metrics $\alpha$, $\alpha_1$, $\alpha_2$, $\alpha_3$ and $\alpha_4$, useful in four colorant systems, such as, for example, a CMYK system, has been developed. The metrics are measures based on the pixel values of four colorants (C, M, Y and K) called for in a CMYK space pixel. The equations and functions described below are for normalized pixels with colorant pixel values in the range of 0 to 1.

$\alpha_1$ is defined as:

$$\alpha_1 = \min(C, M, Y) \quad (1)$$

Therefore $\alpha_1$ is a measure of the distance from the pixel to one of the surfaces 380, 384, 388 of the gamut cube that include the white corner 172 (see FIG. 1). The measure is based on the pixel value of the non-black colorant with the lowest pixel value.

$\alpha_2$ is defined as:

$$\alpha_2 = 1 - \max(C, M, Y) \quad (2)$$

Therefore $\alpha_2$ is a measure of the distance from the pixel to one of the surfaces 392, 396, 398 of the gamut cube that include the black corner 164 (see FIG. 1). The measure is based on the pixel value of the non-black colorant with the highest pixel value.

$\alpha_3$ is defined as:

$$\alpha_3 = 1 - K \quad (3)$$

Therefore $\alpha_3$ is a measure of the distance from the pixel to saturated black (not shown).

$\alpha_4$ is defined as:

$$\alpha_4 = (1 - \max(C, M, Y))/(1 - \min(C, M, Y)) \quad (4)$$

$\alpha_4$ is related to the closeness of the pixel to the neutral axis 168 (see FIG. 1). For points on the neutral axis $\alpha_4$ is equal to 1. For primary colors, other than black and white, on the corners 128, 132, 136, 140, 144, and 148 of the gamut cube, $\alpha_4$ is equal to zero.

$\alpha$ is defined as:

$$\alpha = 2 * \min(\alpha_1, \alpha_2, \alpha_3, \alpha_4) \quad (5)$$

$\alpha$ holds the metric that most strongly reports the position of the pixel to be far from the center of the gamut after multiplying the metric by a convenient scaling factor.

The red 140, green 144, blue 148, cyan 128, magenta 132, yellow 136 and white 172 corners of the gamut cube are located where at least one colorant's pixel value is zero. For pixels near these corners $\alpha_1$ is near zero.

The red 140, green 144, blue 148, cyan 128, magenta 132, yellow 136 and black 164 corners of the gamut cube are located where at least one colorant's pixel value is 1. For pixels near these corners $\alpha_2$ is near zero.

For pixels where the black colorant has a high pixel value $\alpha_3$ is near zero.

For pixels far from the neutral axis $\alpha_4$ is near zero.

$\alpha$ is near zero in all the above cases. Therefore, when a pixel is far from the center of the gamut cube $\alpha$ is near zero. $\alpha$ is near one for pixels near the center of the gamut cube.

A function of $\alpha$, $f(\alpha)$, is used to smoothly blend between using an emulation transform for pixels near the center of the gamut cube and using an identity transform for pixels near the primary colors.

The blending function is defined as:

$$CMYK_{blended} = f(\alpha) * CMYK_{emulation} + (1 - f(\alpha)) * CMYK_{identity} \quad (6)$$

When $f(\alpha)$ has a value near zero, the $CMYK_{identity}$ term dominates. The pixel is treated as a primary color and the colorant pixel values are changed very little as the pixel is mapped from the first device's color gamut to the second device's color gamut. When the value of $f(\alpha)$ is near one, the $CMYK_{emulation}$ term dominates. The pixel is treated as a pictorial pixel and the colorant pixel value is modified as is required to map to the second device's pictorial gamut. As $f(\alpha)$ moves away from the extremes the effects of the emulation transform and the identity transform are blended together.

The function $f(\alpha)$ can be any smoothly varying monotonic function. However, $f(\alpha)$ should be chosen with the shape and relative size of the pictorial gamut 174 in mind. $f(\alpha)$ should be chosen so that the value of $f(\alpha)$ is near 1 for all or most of the pixels in the pictorial gamut 174.

Figure 4:
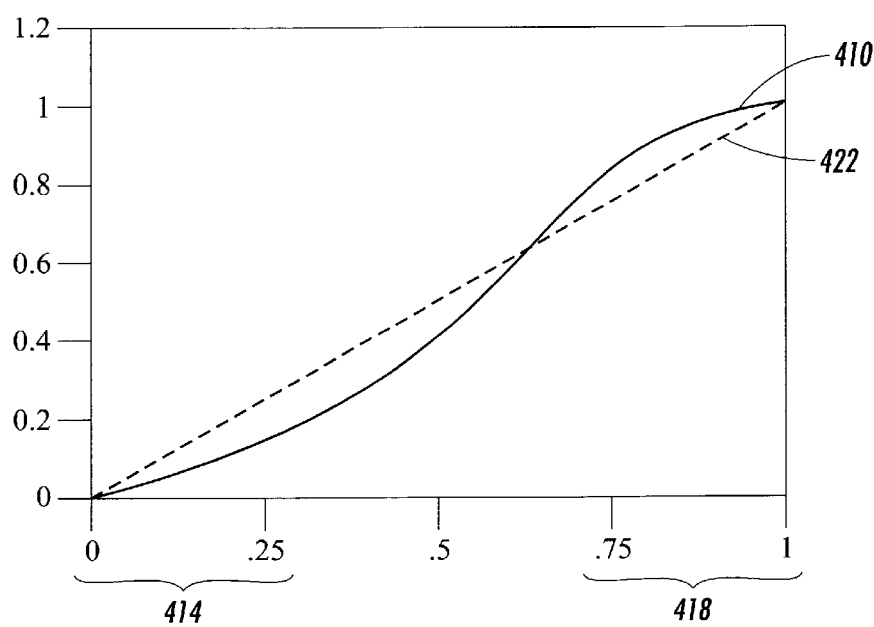
FIG. 4 is a graph illustrating two functions that can be used as blending functions.

Referring to FIG. 4, a cumulative Gaussian 410 function can be chosen as $f(\alpha)$. For example, with a mean $\mu = 0.5$ and a standard deviation $\sigma = 0.2$ the Gaussian function has a first region 414 of relatively shallow slope where $\alpha$ is near zero and a second region 418 of relatively shallow slope where $\alpha$ is near one. Between the two regions 414, 418 the slope changes more rapidly as the pixel location, as measured by α, changes from the outer edges of the centrally located zone and within the pictorial gamut, to peripherally located and near the primary colors.

An example of another function that can be chosen for use as f(α) is a gamma function. In that case the gamma function f(α) would be defined as:

$$f(\alpha) = \alpha_\gamma \quad (7)$$

Typical useful values for gamma γ range from 0.5 to 2. Where γ=1, f(α) =α and, as shown at 422 the blending function is linear.

Figure 5:
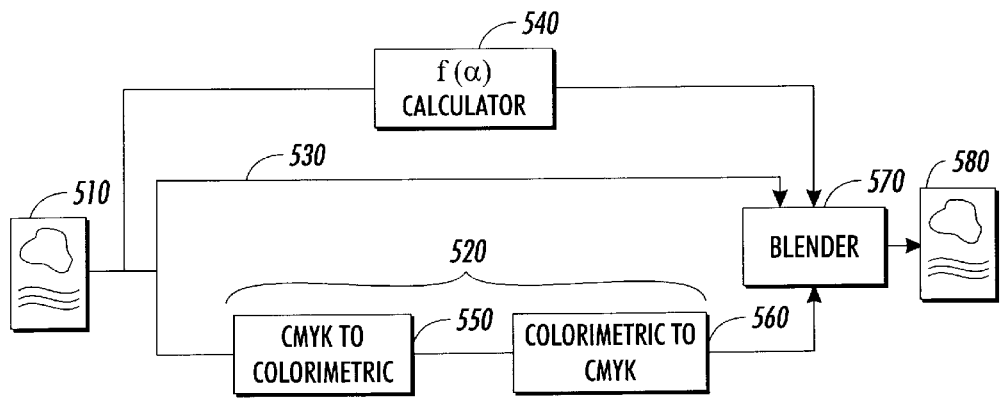
FIG. 5 is a block diagram illustrating a blending process.

Referring to FIG. 5, the blending process is illustrated as a block diagram. A source CMYK image 510 is delivered to three sub-processes, the emulation transform 520, the identity transform 530 and a blending function calculator 540.

The emulation transform 520 is depicted as a two-stage process. In a first stage 550 of the emulation transform a source device profile is used to transform the input CMYK image to a standard calorimetric space such as, for example of CIELAB color space. In a second stage 560 of the emulation transform, a destination device profile is used to transform a standard calorimetric space version of the image to a destination CMYK version of the image. The second stage 560 of the emulation transform 520 delivers transformed pixel information to a destination CMYK image calculator 570.

The identity transform 530 is depicted simply as a signal flow path without a functional block since the identity transform 530 does not operate to change the input image. The identity transform 530 delivers input CMYK image pixel information to the destination CMYK image calculator 570.

The blending function calculation block 540 examines the incoming CMYK source image and calculates α, $\alpha_1$, $\alpha_2$, $\alpha_3$, $\alpha_4$ and f(α) for each pixel. The blending function calculation block 540 delivers the value of f(α) for each pixel in the source image 510 to the destination CMYK image calculator 570.

The destination CMYK image calculator 570 accepts as input the terms on the right hand side of equation 6 and calculates the destination CMYK image 580 using equation 6 to blend between the emulation transform and the identity transform as controlled by f(α).

Whenever two or more functions or transforms are blended together, care must be taken to ensure that no visible artifacts arise from the blending process. In addition to using a smooth blending function such as those depicted in FIG. 4 and equations 7, it is sometimes necessary to take further action against artifact generation. Such further action can include adjusting of functions being blended. In the case of the present invention, this means adjusting the emulation and identity transforms so that the differences in their characteristics are reduced, particularly in the region of blending.

For example, without adjustments the method described above can lead to rendered images that are darker and more saturated than is ideal.

Figure 6:
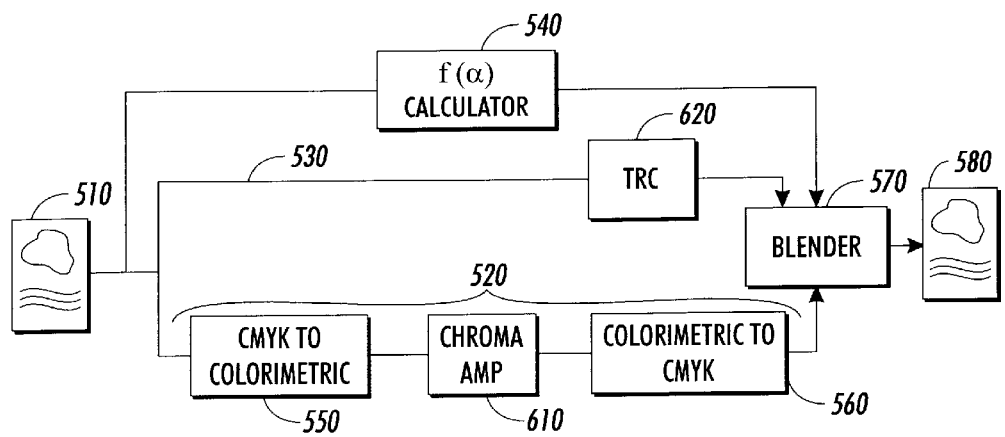
FIG. 6 is a block diagram illustrating possible modifications to the process depicted in FIG. 5.

Referring to FIG. 6, which is similar to FIG. 5, and wherein like functional blocks carry the same reference numerals and wherein new functional blocks carry new reference numerals, the first adjustment is to apply chroma amplification after the first stage 550 of the emulation transform 520.

A Chroma amplification stage 610 increases the value of a chroma component of the standard colorimetric version of the image in a suitable fashion. One method of doing this is to apply a simple multiplicative chroma amplification factor A to the chroma component of the standard calorimetric version of the image before it is passed to the second stage of the emulation transform. Through trial and error, A=1.15 has been found to work well in prototype systems.

A tone reproduction curve 620 is applied after the identity transform 530. The tone reproduction curve can be used, for example, to vary an image lightness and to bring the identity transform closer to the emulation transform.

For simplicity, the method 300 has been described as if it is performed on the pixels of an image. However, the method can be, and preferably is, encapsulated in the form of a four-dimensional lookup table by performing it on pixels from the first color gamut 100 and storing the results in the Lookup table for later use in transforming an image.

Figure 10:
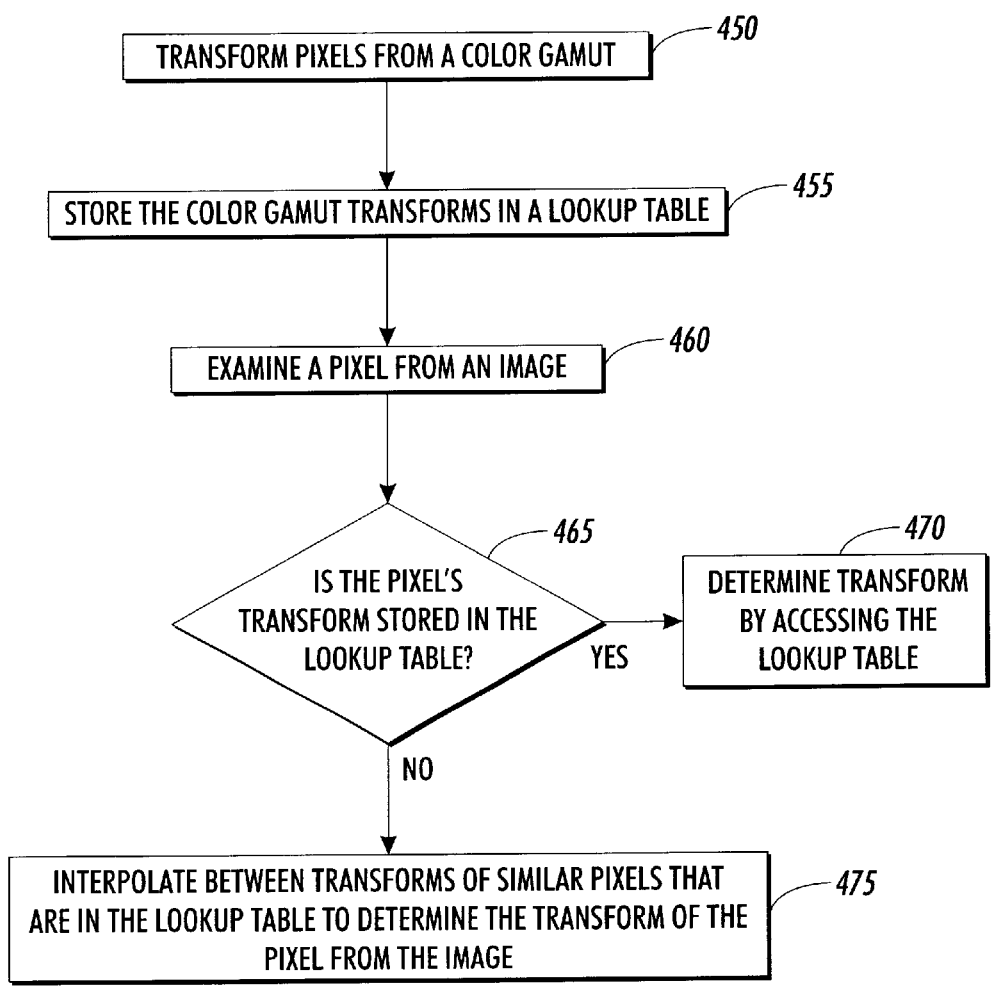
FIG. 10 is a block diagram of the method of FIG. 3 implement through the use of a Lookup Table.

For example, with reference to FIG. 1, FIG. 3, and FIG. 10, every pixel represented in the entire first color gamut 100 with the addition of the black channel (not shown), are processed through the described method 300 in a color gamut transformation step 450. In a results storage step 455, the results are stored in the four-dimensional lookup table. From then on, the colorant pixel values in pixels from an actual image are examined in a pixel-examining step 460 and used as indexes into the lookup table. The value stored in the location addressed by the colorant pixel values is accessed in a transform determining step 470 and delivered as the transformed version of the pixel. The value is the same as would have resulted if the pixel itself were processed through the method 300 directly.

If the lookup table described above includes a storage location for every possible set of pixel values there would have to be 4,294,967,296 storage locations (assuming a system comprising 256 levels of pixel values for each colorant). Depending on a format used to store the transformed pixel values, 4 bytes of computer memory or more could be required for each storage location. Therefore the lookup table could require as much as 17,179,869,184 bytes of computer memory. That much computer memory can be prohibitively expensive.

An alternative is to use a lookup table comprising only a small fraction of the locations in the described lookup table and to use interpolation techniques to quickly calculate the transform value. For example, a lookup table containing a transformed pixel value for approximately every twenty-fifth colorant pixel value might have an entry for cyan=0, 25, 50, 75, 100, . . . , 225, 256, magenta=0, 25, 50, 75, 100, . . . , 225, 250, yellow=0, 25, 50, 75, 100, . . . , 225, 256 and black=0, 25, 50, 75, 100, . . . , 225, 256. Such a table would only comprise 10,000 locations and might require 40,000 bites of computer memory. If in a lookup table examination step 465, it is determined that a pixel from an image calls for colorant pixel values that exactly match the index values of a stored transform pixel value then processing passes to the transform determining step 470 and the entry in the table is used as the transformation of the image pixel. For example the transformation of a pixel calling for cyan=200, magenta=25, yellow=100, black=75 is read directly from the table. On the other hand, if in the lookup table examination step 465, it is determined that a pixel from the image calls for colorant pixel values that do not match the index values of a stored transform pixel value then in an interpolation step 475 four-dimensional interpolation techniques are used to calculate the transform of a pixel calling for, for example, cyan=183, magenta=26, yellow=100, black=75, that falls between the stored values. For this pixel, the colorant values are used to generate or calculate the indexes of actual table entries that would surround or would be near an entry associated with the pixel if the pixel had an associated entry. The generated indexes are used to retrieve transform values that are near the transform value of the pixel. The transform values are used in the interpolation process to determine the transform value of the pixel.

This embodiment of the invention has been described with regard to a particular set of transforms (emulation and identity) with regard to a particular set of rendering intents. Obviously other transforms and other rendering intents can be substituted.

Furthermore, while this embodiment is concerned with the blending of two transforms and two sub-gamuts, the method can be extended to blend a plurality of transforms for a plurality of sub-gamuts. A plurality of weighting functions can be used to vary the weight of a plurality of transforms. The weighted transforms can then be combined or blended together. The only restriction on the weighting functions is that when the weighting functions themselves are combined in the same manner as the weighted transforms, the combination must equal 1.

For example, the terms on the right hand side of equation 6 are combined by summing and if one combines the weighting functions in equation 6 ($f(\alpha)$ and $1-f(\alpha)$) in a like manner, by summing, the combination equals 1 no matter what the value of $\alpha$. In a similar manner, a plurality of weighting functions can be used to blend a plurality of transforms as long as the plurality of weighting functions combine to equal 1.

An example of a combination of weighted transforms is a weighted summation of transforms.

Figure 7:
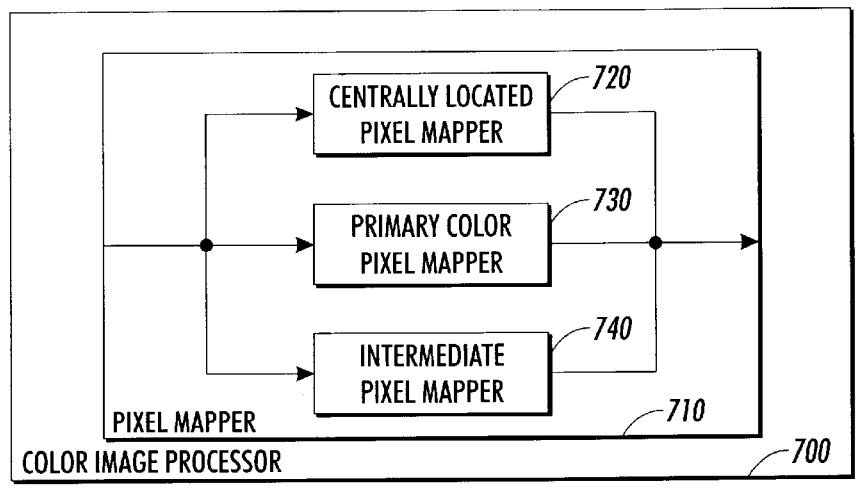
FIG. 7 is a block diagram of a color image processor for rendering an image via the method depicted in FIG. 3.

Referring to FIG. 7, a color image processor 700 for carrying out the method of the present invention comprises a pixel mapper 710. The pixel mapper maps pixels from a first or source device's color gamut to a second device's color gamut. The pixel mapper comprises sub-mappers including a centrally located pixel mapper 720, a primary color pixel mapper 730 and an intermediate pixel mapper 740. The centrally located pixel mapper 720 maps pixels near the center of the source device's color gamut to color matched pixels in the destination device's color gamut. The primary color pixel mapper 730 maps pixels that represent pure, vivid primary colors in the first device's color space to pure, vivid primary colors in the second device's colors space. The intermediate pixel mapper 740 maps pixels that are not near the center of the first device's color gamut and do not represent primary colors to the second devices color space through a blend of the techniques used by the centrally located pixel mapper 720 and the primary color pixel mapper 730. The location of each intermediate pixel 182 within the first device's color gamut 100 controls the blending process.

Figure 8:
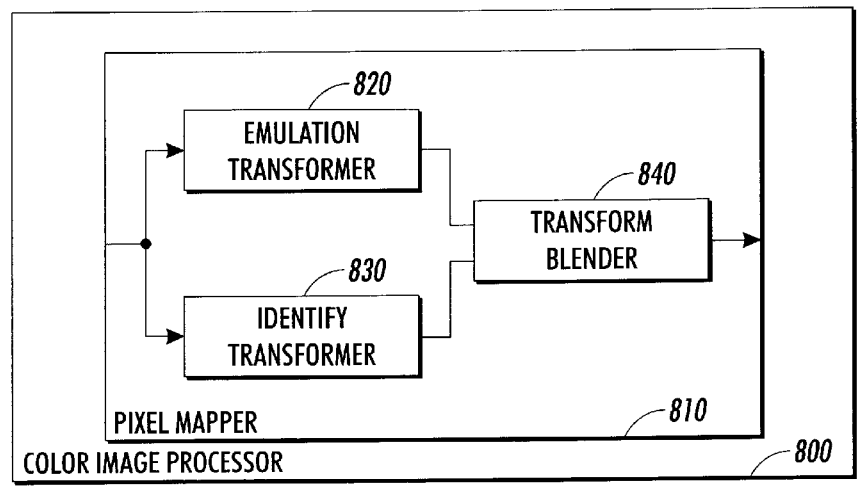
FIG. 8 is a block diagram of the color image processor of FIG. 7 showing details of a particular implementation.

Referring to FIG. 8 a color image processor 800 can include a pixel mapper 810 that implements its three sub-mappers in the form of an emulation transformer 820, an identity transformer 830 and a transform blender 840.

The emulation transformer 820 maps pixels in the first device's color gamut to pixels in the second device's color gamut. The emulation transformers 820 mapping is controlled by differences between a first device's color profile and a second device's color profile. The emulation transformer 820 attempts to emulate the first device on the second device. How the emulation transformer maps pixels from the source device's color gamut to the destination device's color gamut is usually base on a rendering intent. For example, the emulation transformer may be optimized to map pictorial images from one space to another. The emulation transformer can include adjusters, such as, for example, chroma amplifiers, where necessary or beneficial.

The identity transformer 830 is often just a signal path that simply maps pixels in the first device's gamut to pixels with exactly the same colorant pixel values in the second device's color space. However, the identity transformer 830 can include adjusters such as tone reproduction curves where necessary or beneficial. Identity transformation preserves the purity of primary colors while sometimes sacrificing color accuracy.

The emulation transformer 820 and the identity transformer 830 deliver pixel information to the transform blender 840. The transform blender 840 uses pixel information from the emulation transformer 820 to map pixels that are near the center of the source device's color gamut to color matched pixels in the destination device's color gamut. The transform blender 840 uses pixel information from the identity transformer 830 to map pixels that represent pure primary colors in the source device's color gamut to pixels that represent primary colors in the second device's color gamut. The transform blender 840 combines pixel information from both transformers 820, 830 in such a way as to map intermediate pixels that do not represent primary colors and are not near the center of the source device's color gamut to appropriate pixels in the destination device's color gamut. The closer the intermediate pixels are to the center of the color gamut the more the transform blender 840 strives to maintain color accuracy. The closer the intermediate pixels are to primary colors the more the transform blender 840 strives to maintain color purity.

Figure 9:
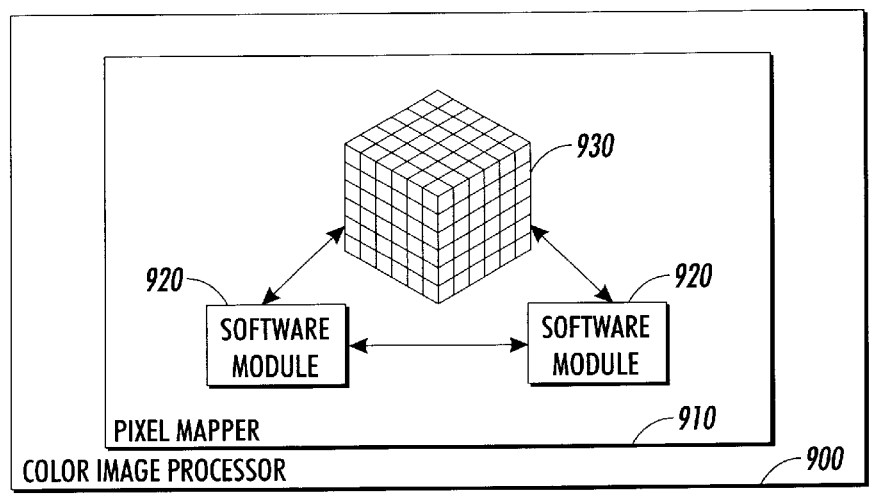
FIG. 9 is a block diagram of the color image processor of FIG. 7 showing an implementation that includes a Lookup Table.

Whether or not the pixel mapper 710, 810 and the sub-mappers 720, 730, 740 are implemented in the form of the emulation and identity transformers 820, 830 and transform blender 840, the pixel mapper 710, 810 is usually implemented as a set of software modules that access a lookup table. For example, referring to FIG. 9, a color image processor 900 comprises a pixel mapper 910 that includes software modules 920 that access a lookup table 930. The lookup table 930 stores pre-calculated pixel transformations. The lookup table 930 can contain an entry for every possible combination of colorant pixel values. However such a table is usually considered to be too large. The lookup table 930 usually contains entries for a small subset of the possible colorant pixel value combinations. The software modules 920 then use interpolation to calculate the transform values of pixels that do not have corresponding entries in the lookup table.

The pixel mapper 710, 810 is stored in computer or microprocessor memory and executed by a microprocessor or central processing unit. However the functions of the pixel mapper 710, 810 can be carried out in various ways and by various devices, including but not limited to distributed processors and various components interconnected via computer networks.

This embodiment of the invention has been described with regard to a particular set of transforms (emulation and identity) with regard to a particular set of rendering intents. Obviously other transforms and other rendering intents can be substituted. Furthermore, while this embodiment has two transformers the color image processor can comprise a plurality of transformers, each transformer delivering its output to a blender that blends the output from the plurality of transformers.

The invention has been described with reference to particular embodiments. Modifications and alterations will occur to others upon reading and understanding this specification. For example, different blending functions can be used. The blending technique can be applied to transforms other than emulation and/or identity transforms. The transforms used can focus on rendering intents other than those designed to enhance pictorial image rendering quality. Colorimetric standards other than CIELAB can be used in the emulation transform. The emulation transform can operate directly, avoiding the use of a calorimetric standard. The blending function can be selected to blend between transforms that focus on other than centrally located pixels and primary color pixels. The method can be used on systems that use different colorants. The method can be extended to systems that include more than four colorants. It is intended that all such modifications and alterations are included insofar as they come within the scope of the appended claims or equivalents thereof.

What is claimed is:

1. A method for rendering an image, the image comprising pixels, the image having been prepared for rendering on a first device and being rendered on a second device, the first device including an associated first color gamut having at least a first sub-gamut, a second sub-gamut and a transition region therebetween, the second device including an associated second color gamut having at least a first sub-gamut, a second sub-gamut and a transition region therebetween, the method comprising the steps of:

finding a location for each pixel within the first color gamut;

mapping a pixel located in the first sub-gamut of the first color gamut under a first rendering intent through a first transform to a pixel within the first sub-gamut of the second color gamut;

mapping a pixel located in the second sub-gamut of the first color gamut under a second rendering intent through a second transform to a pixel in the second sub-gamut of the second gamut, and mapping a pixel located between the first sub-gamut and the second sub-gamut of the first color gamut via a blend of the first transform and the second transform, the blend being based on a predetermined characteristic of the pixel, the predetermined characteristic being a function of a location of the pixel within the first color gamut, whereby the closer the pixel is to the first sub-gamut of the first color gamut, the stronger the influence of the first rendering intent is on the mapping method and the closer the pixel is to the second sub-gamut of the first color gamut the stronger the influence of the second rendering intent is on the mapping method, thereby beneficially combining the effects of multiple rendering intents in the rendering of the image.

2. The method for rendering an image of claim 1 wherein the first sub-gamut of the first color gamut is centrally located within the first color gamut, and the second sub-gamut of the first color gamut is peripherally located within the first color gamut.

3. The method for rendering an image of claim 1 wherein the first rendering intent comprises a preservation of pictorial characteristics.

4. The method for rendering an image of claim 1 wherein the second rendering intent comprises a preservation of primary colors as pure primary colors.

5. The method of rendering an image of claim 1 wherein the steps of finding and mapping further comprise:

mapping a first set of pixels with colorant pixel values located in the first sub-gamut of the first color gamut under a first rendering intent through a first transform to a pixel within the first sub-gamut of the second color gamut to generate a first set of transformed pixel values;

storing the first set of transformed pixel values in a lookup table using the original colorant pixel values of each transformed pixel as an index to the transformed pixels storage location;

mapping a second set of original pixels with colorant pixel values located in the second sub-gamut of the first color gamut under a second rendering intent through a second transform to a pixel in the second sub-gamut of the second gamut to generate a second set of transformed pixel values;

storing the second set of transformed pixel values in the lookup table using the original colorant pixel values of each transformed pixel as an index to the transformed pixels storage location;

mapping a third set of original pixels with colorant pixel values located between the first sub-gamut and the second sub-gamut of the first color gamut via a blend of the first transform and the second transform, the blend being based on a predetermined characteristic of the pixel, the predetermined characteristic being a function of a location of the pixel within the first color gamut;

storing the third set of transformed pixel values in the lookup table using the original colorant pixel values of each transformed pixel as an index to the transformed pixels storage location to complete a lookup table that pre-calculates the transform pixels values of pixels from an image, and using colorant pixel values of each pixel from the image to generate indexes into the lookup table to determine the transformed pixel values of each pixel.

6. The method of rendering an image of claim 5 wherein the step of using colorant pixel values of each pixel from the image to generate image pixel indexes into the lookup table to determine the transformed pixel values further comprises;

noting the transform pixel values of entries in the lookup table with indexes near image pixel indexes, and interpolating between those transform pixel values to determine the transformed pixel value of pixels from the image.

7. The method for rendering an image of claim 1 wherein the first color gamut is a four-dimensional color gamut.

8. The method for rendering an image of claim 7 wherein the first color gamut is in CMYK space, the first transform is an emulation transform ($CMYK_{emulation}$), the second transform is an identity transform ($CMYK_{identity}$), wherein the finding step further comprise:

noting a pixel value of colorant C called for in each pixel;

noting a pixel value of colorant M called for in each pixel;

noting a pixel value of colorant Y called for in each pixel;

noting a pixel value of colorant K called for in each pixel;

defining a first metric $\alpha_1$, for each pixel, with the equation:

$$\alpha_1 = \min(C,M,Y);$$

defining a second metric $\alpha_2$, for each pixel, with the equation:

$$\alpha_2 = 1 - \max(C,M,Y);$$

defining a third metric $\alpha_3$, for each pixel, with the equation:

$$\alpha_3 = 1 - K;$$

defining a fourth metric $\alpha_4$, for each pixel, with the equation:

$$\alpha_4 = (1-\max(C,M,Y))/(1-\min(C,M,Y)), \text{ and}$$

defining a fifth metric $\alpha$, for each pixel, with the equation:

$$\alpha = 2*\min(\alpha_1, \alpha_2, \alpha_3, \alpha_4),$$

whereby $\alpha$ is a metric for the location of each pixel.

9. The method for rendering an image of claim 8 wherein the mapping steps further comprise:

defining a blending function $f(\alpha)$, for each pixel;

calculating a blended transformation $CMYK_{blended}$, for each pixel, based on the equation:

$$CMYK_{blended} = f(\alpha) * CMYK_{emulation} - (1+f(\alpha)) * CMYK_{identity}.$$

10. The method for transforming an image of claim 9 wherein $f(\alpha)$ comprises a cumulative Gaussian function.

11. The method for transforming an image of claim 9 wherein the cumulative Gaussian function has a mean of 0.5.

12. The method for transforming an image of claim 9 wherein the cumulative Gaussian function has a standard deviation of 0.2.

13. The method for transforming an image of claim 8 wherein $f(\alpha)$ is a gamma function.

14. The method for transforming an image of claim 13 wherein gamma is in the range of 0.5 to 2.

15. The method for transforming an image of claim 13 wherein gamma is 1.

16. A color image processor for rendering images prepared for rendering on a first device, on a second device, the first device having an associated first color gamut, the first color gamut having at least a first sub-gamut, a second sub-gamut and a transition region therebetween, the second device having an associated second color gamut, the second color gamut having at least a first sub-gamut, second sub-gamut and a transition region therebetween, the color image processor including a pixel mapper comprising:

a first sub-gamut pixel mapper for mapping pixels located in the first sub-gamut of the first color gamut under a first rendering intent through a first transform to pixels within the first sub-gamut of the second devices color gamut;

a second sub-gamut pixel mapper for mapping pixels located in the second sub-gamut of the first color gamut under a second rendering intent through a second transform to pixels in the second sub-gamut of the second color gamut, and an intermediate pixel mapper for mapping pixels located between the first sub-gamut and the second sub-gamut of the first color gamut via a blend of the first transform and the second transform, the blend being based on a predetermined characteristic of the pixel, the predetermined characteristic being a function of a location of the pixel within the first color gamut, whereby the closer the pixel is to the first sub-gamut of the first color gamut, the stronger the influence of the first rendering intent is on the mapping method, and the closer the pixel is to the second sub-gamut of the first color gamut the stronger the influence of the second rendering intent is on the mapping method, thereby beneficially combining the effects of multiple rendering intents in the rendering of the image.

17. The color image processor of claim 16 wherein the first sub-gamut mapper is a centrally located pixel mapper for mapping pixels that call for significant color mixture.

18. The color image processor of claim 16 wherein the second sub-gamut mapper is a peripherally located pixel mapper for mapping pixels that represent primary and nearly primary colors.

19. The color image processor of claim 16 wherein the first transformer is an emulation transformer.

20. The color image processor of claim 16 wherein the second transformer is an identity transformer.

21. The color image processor of claim 16 where in the pixel mapper further comprises:

a first transformer for transforming image pixels based on the first rendering intent;

a second transformer for transforming image pixels based on the second rendering intent, and a transform blender for mapping pixels by smoothly blending the output of the first transformer and the second transformer based on the location of the pixels within the first devices color gamut.

22. The color image processor of claim 21 further comprising:

a chroma amplifier included within the first transformer.

23. The color image processor of claim 21 further comprising:

a tone reproduction curve included within the second transformer.

24. A method for rendering an image, the image comprising pixels, the image having been prepared for rendering on a first device and being rendered on a second device, the first device including an associated first color gamut having a plurality of sub-gamuts and a transition region between the sub-gamuts, the second device including an associated second color gamut having a plurality of sub-gamuts and a transition region between the sub gamuts, the method comprising the steps of:

applying a plurality of weighting functions to a plurality of transforms, the transforms being for transforming pixels located in the first color gamut to pixels located in the second color gamut under a plurality of rendering intents, the weighting functions being functions of the location of the pixels location within the first color gamut, the application of weighting functions generating a plurality of weighted transforms, and combining the plurality of weighted transforms in a manner so that a similar combination of the weighting functions equals 1, the combination of weighted transforms generating a blended transform beneficially combining the plurality rendering intents.

25. The method for rendering an image of claim 24 wherein the step of combining further comprises:

a weighted summation.

* * * * *